United States Patent
Shire et al.

[15] 3,704,034
[45] Nov. 28, 1972

[54] OFFSET CONNECTOR

[72] Inventors: Harold Shire, Los Angeles; Ira R. Newman, Lakeview Terrace, both of Calif.

[73] Assignee: General Connectors Corporation, Burbank, Calif.

[22] Filed: July 10, 1970

[21] Appl. No.: 53,919

[52] U.S. Cl. ............... 285/47, 285/114, 285/178, 285/187
[51] Int. Cl. ............................................. F16l 11/12
[58] Field of Search ........ 285/178, 114, 47, 343, 177, 285/348, 354, 322, 323, 187; 277/153, 174

[56] References Cited

UNITED STATES PATENTS

| | | |
|---|---|---|
| 3,206,229 | 9/1965 | Kramer ................. 285/114 |
| 2,579,619 | 12/1951 | Scott ................... 285/114 X |
| 3,447,821 | 6/1969 | Bochory ................ 285/178 |
| 1,304,980 | 5/1919 | Hirshstein ............. 285/178 X |
| 2,223,859 | 12/1940 | Scharbau .............. 285/178 X |

FOREIGN PATENTS OR APPLICATIONS

| | | |
|---|---|---|
| 6,410,216 | 3/1965 | Netherlands ............ 277/153 |
| 28,156 | 11/1914 | Great Britain ........... 285/178 |
| 1,432,349 | 2/1966 | France .................. 285/178 |
| 384,700 | 12/1932 | Great Britain ........... 285/322 |

*Primary Examiner*—Dave W. Arola
*Attorney*—Julius L. Rubinstein

[57] ABSTRACT

In order to connect pipes which are generally parallel to each other but which are misaligned, offset tubing is connected to the free ends of the misaligned pipes. If the misalignment of the pipes is equal to or less than twice the offsets of the offset connectors, the offset connector can be rotated into at least one axis of alignment so that the misaligned pipes can be connected without stress. If the misalignment of the pipes is greater than twice the offset of the connectors, an intermediate offset connector is connected between the offset connectors to reduce the misalignment and make possible at least one axis of alignment between the pipes. The intermediate offset connector is designed so the misaligned pipes ride on seals inside the connector to permit axial adjustment of the pipes and compensation for thermal expansion of the pipes. In addition, this arrangement provides a limiting pivoting motion of the pipes on the seals for connecting pipes which have some degree of non-axial misalignment.

18 Claims, 16 Drawing Figures

PATENTED NOV 28 1972

INVENTORS.
HAROLD SHIRE
IRA R. NEWMAN

ATTORNEY

INVENTORS.
HAROLD SHIRE
IRA R. NEWMAN

INVENTORS.
HAROLD SHIRE
IRA R. NEWMAN
ATTORNEY

INVENTORS.
HAROLD SHIRE
IRA R. NEWMAN

OFFSET CONNECTOR

BRIEF SUMMARY

As modern aircraft have grown in size and complexity, the problem of misalignment of the pipes caused by errors in the construction of the airplane has become more important. The pipes are often sufficiently long, particularly in the larger airplanes, so they can be bent enough for connection. When this is done it leaves a permanent stress in the pipes which after a period of time could cause failure which might involve catastrophic consequences.

It is apparent that the problem of misalignment could be corrected by using offset connectors, but since the magnitude of the misalignment varies from airplane to airplane, no one size of offset connector would be satisfactory in all cases and it would not be economical to provide a large variety of different offset connectors to correct for the misalignment. However, it would be desirable to provide an offset connector which could within predetermined limits compensate for all degrees of misalignment. This was done in this invention by providing a pair of offset tubes or offset bushings which could be sealingly connected to the free ends of the misaligned pipes.

As a practical matter the range of misalignment of the pipes that have to be considered is limited. Consequently, there is no need to consider all possible magnitudes of misalignment. Under these circumstances, considerations of economy in manufacture suggest that it would be desirable to provide a single size offset connector pipe or bushing which can fit into the ends of the misaligned pipes. If both offset connected pipes or bushings are the same size, the maximum magnitude of misalignment which can be corrected by such offsets would be twice the offset of the offset pipe or bushing. Since the usual range of misalignment is likely to be known, one can design offset connectors so that all degrees of misalignment within the usual range can be compensated for.

However, one does occasionally run into a magnitude of misalignment which is greater than the capacity of the offset connector pipes. In such a case an intermediate offset connector could be used connected to the offset connector pipes to compensate for the additional misalignment. The only requirement is that the magnitude of the offset of the intermediate offset connector be equal to or greater than the distance between the axis of closest approach between the ends of the offset connectors.

The increasing size of airplanes has increased the length of the pipes. This has introduced problems connected with thermal expansion and tolerance variations in the length of the pipes. This suggests that the intermediate offset connector could be given the additional function of compensation for thermal expansion, tolerance variations in length, and limited non-axial misalignment.

What is needed therefore and comprises an important object of this invention is to provide a universal offset connector structure for connecting misaligned pipes.

A further object of this invention is to provide a universal connector for connecting misaligned pipes and which can compensate for thermal expansion, and non-axial misalignment.

Still another important object of this invention is to provide a universal offset connector structure for connecting mis-aligned pipes which have some degree of non-axial misalignment and which can automatically compensate for thermal expansion or contraction.

These and other objects of this invention will become more apparent and better understood in the light of the accompanying specification and drawings wherein.

Figure 10:
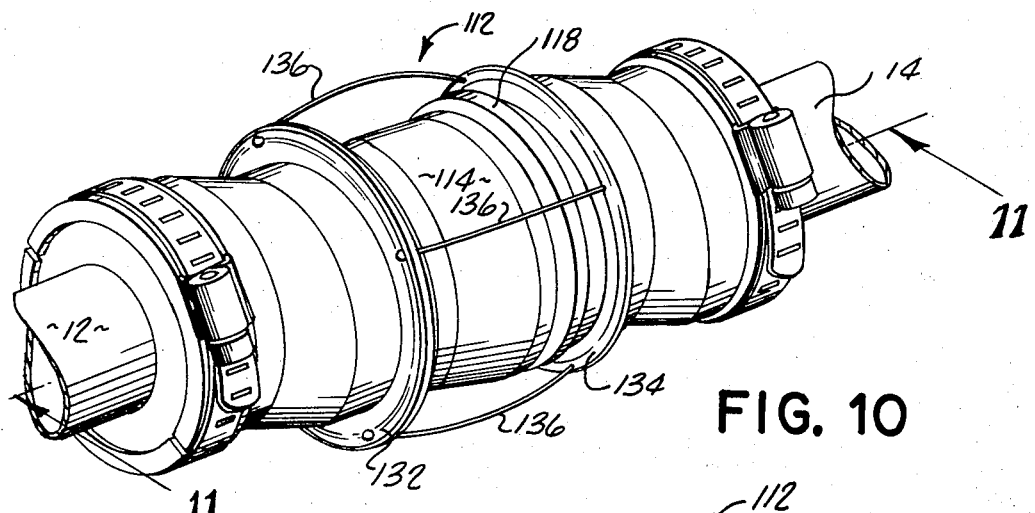

FIG. 10 discloses a perspective view of an offset connector having rotatedly mounted offset connector tubes connected thereto.

Figure 11:
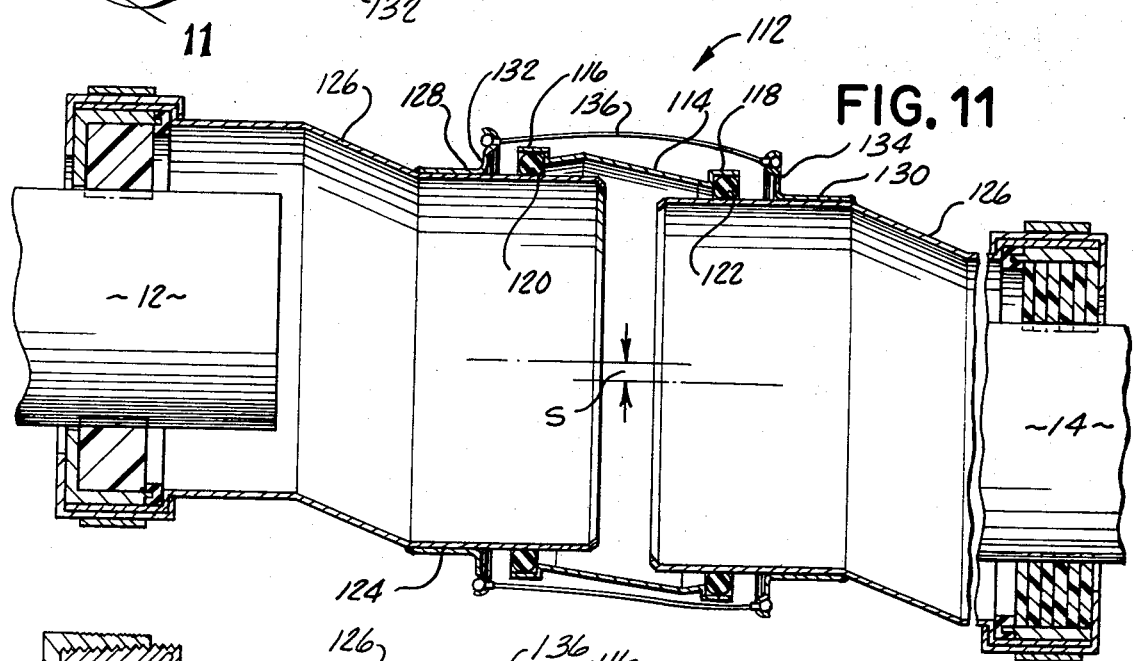

FIG. 11 is a sectional elevational view of the offset connector tubes and connectors shown in FIG. 10.

Figure 12:
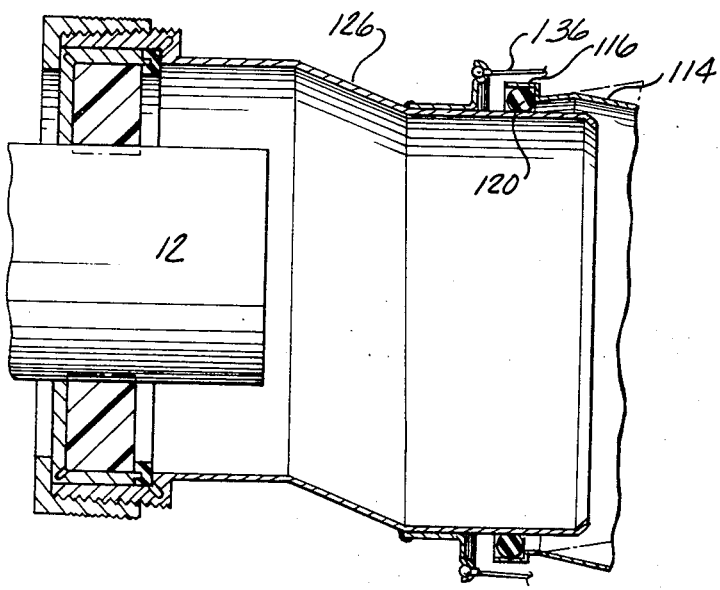

FIG. 12 discloses a modified offset tube having means for stopping leakage in the seals and showing the pivoting action of the end of the tubes in the connector.

Figure 13:
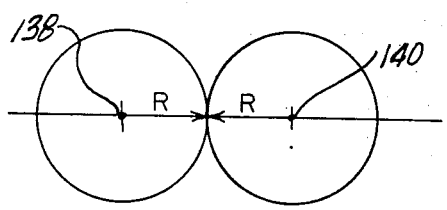

FIG. 13 is a diagrammatic view disclosing the axes of the misaligned pipes at the greatest separation which still permits the axes of the offset connector tubes to be moved into alignment.

Figure 14:
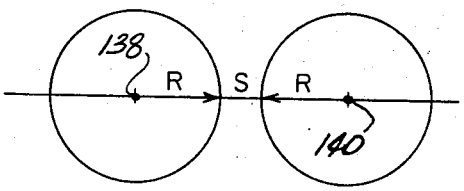

FIG. 14 is a diagrammatic view disclosing the axes of misaligned pipes separated by a distance too great to permit the axes of the tubes to be moved into alignment.

Figure 15:
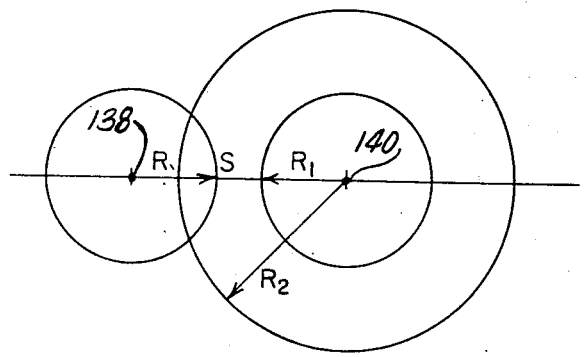

FIG. 15 discloses the effect of an intermediate offset connector in connecting separated pipes by a distance too great for the capacity offset connector tubes.

Figure 16:
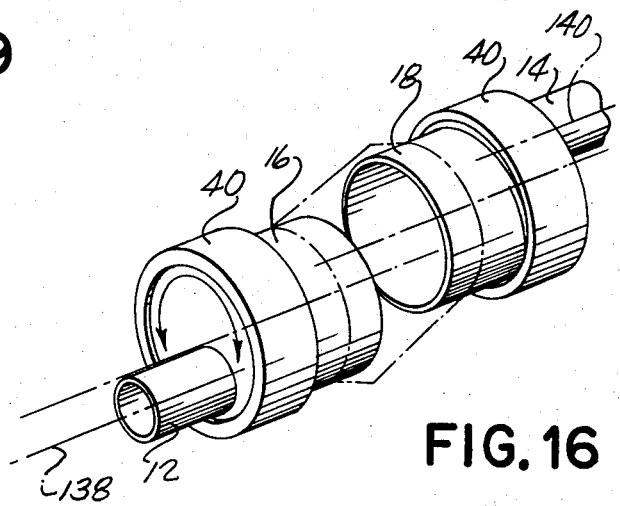

FIG. 16 is a diagrammatic perspective view showing the operation of the offset connector with the rotatably mounted seals therein.

Figure 1:
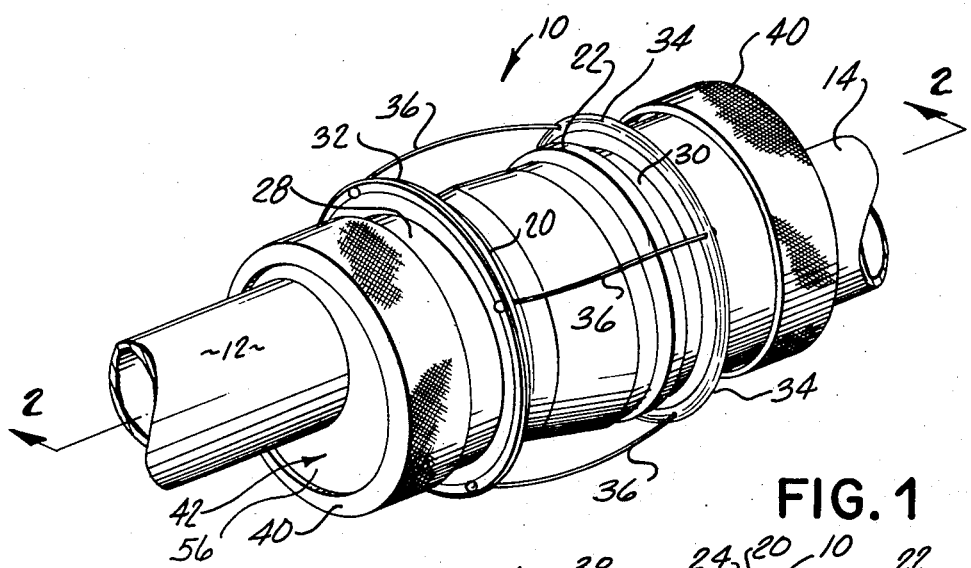
FIG. 1 is a perspective view of an intermediate offset connector having rotatably mounted offset seals therein for connecting misaligned pipes.

Referring now to FIG. 1 of the drawing, the integral intermediate offset connector indicated generally by the reference numeral 10 is shown connecting parallel misaligned pipes 12 and 14. The connector 10 is provided with pipe receiving connector tubes 16 and 18. These connector tubes are inserted in opposite ends of the intermediate offset connector 10 as shown, see FIG. 2.

The offset connector 10 which is as shown an integral offset tube, is provided with inwardly open radially projecting channel shaped ribs 24 and 26 at its opposite ends. With this arrangement, when the connector tubes 16 and 18 are inserted in the ends of the offset connector 10 their axes are separated by a distance S.

Figure 2:
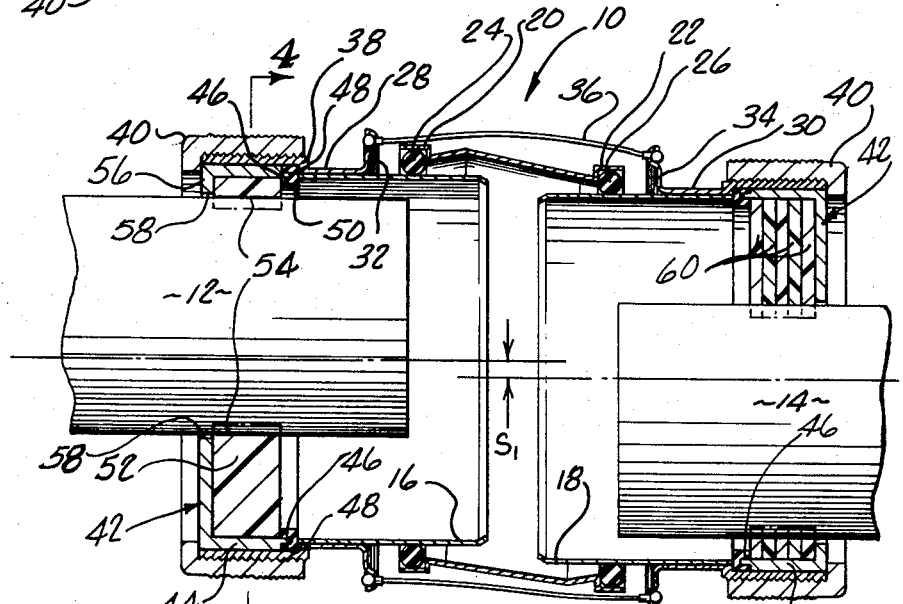
FIG. 2 is a cross-sectional elevational view of the connector shown in FIG. 1.

As shown in FIG. 2 of the drawing the inwardly open radially projecting of channel shaped ribs 20 and 22 receive the O rings seals 24 and 26. The radially projecting ribs 20 and 22 have an additional function and serve as heat radiators to help keep the temperature of the O rings within tolerable limits.

The outer surface of the connector tubes 16 and 18 are in sealing engagement with the O rings 24 and 26 to prevent the escape of gases or fluids flowing through the connector. Connector tubes 16 and 18 are integrally attached to embracing tubes 28 and 30 by welding or any suitable means. Embracing tubes 28 and 30 are provided with radially outwardly projecting flanges 32 and 34. Restraining wires 36 are connected between the flanges to hold pipes 16 and 18 inside connector 10 and withstand internal pressure.

The ends of embracing tubes 28 and 30 are counter bored to define a seal positioning shoulder 38. In addition, the external surface of the ends of the pipes 28 and 30 is threaded to receive the internally threaded retaining nut 40.

In the particular embodiment shown, the seal holding cup shaped closure 42 is fitted into the ends of the tubes 28 and 30 and the external diameter of the cup shaped closure is equal to the internal diameter of the counter bored end of the tubes 28 and 30.

Figure 3:
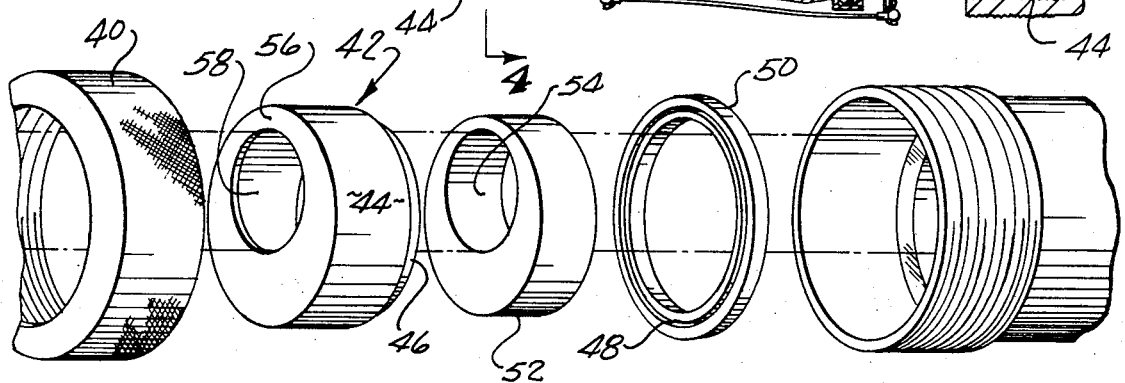
FIG. 3 is an exploded perspective view of the end of the connector shown in FIG. 2.
Figure 4:
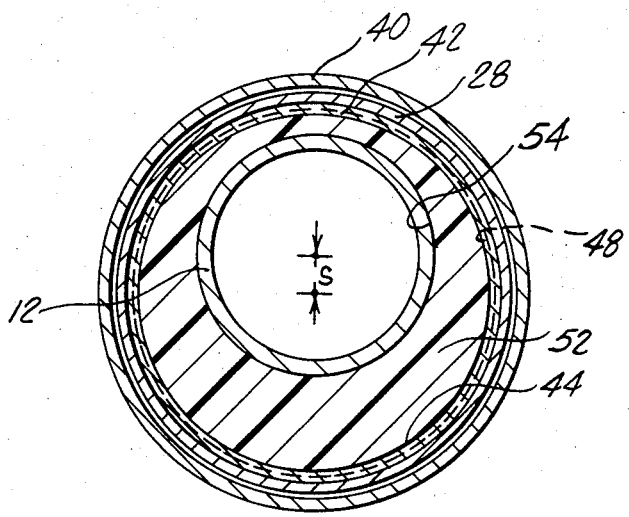
FIG. 4 is a sectional view taken on the line 4—4 of FIG. 2 disclosing the offset bore extending through the seal.

As seen in FIGS. 2 and 3, the walls 44 of the cup shaped closure are reduced in thickness at their free end 46. This portion of the walls is designed to penetrate groove 48 in seal ring 50 which bears against shoulder 38. This arrangement prevents leakage of gasses or fluid flowing through the connector between the outer surface of the walls 44 of the cup shaped closure and the inner surface of the counter bored ends of the tubes 28 and 30.

A massive seal 52 is mounted in the cup shaped closure 42 and this seal is provided with an offset pipe receiving bore 54. The base 56 of the cup shaped closure is provided with a pipe receiving opening 58 having the same diameter as the diameter of the pipe receiving bore 54 in seal 52. With this arrangement, when the nut 40 is threaded onto the ends of tubes 28 and 30 the nut holds the cup shaped closure 42 and seal 52 in sealing engagement with pipes 12 and 14 inside the connector 10.

As shown in FIG. 2, by way of illustration, the opposite end of the connector 10 is provided with different kinds of seals in that seal 60 is formed from a stack of washers all of which have aligned offset openings. Such an arrangement would be important if the ends of the connectors were at different temperatures or pressures which would require the seals to have different compositions to withstand different environmental conditions. As will be explained below the amount of the offset in the bores in seals 52 and 60 are preferably the same in order to standardize parts and minimize costs.

Figure 5:
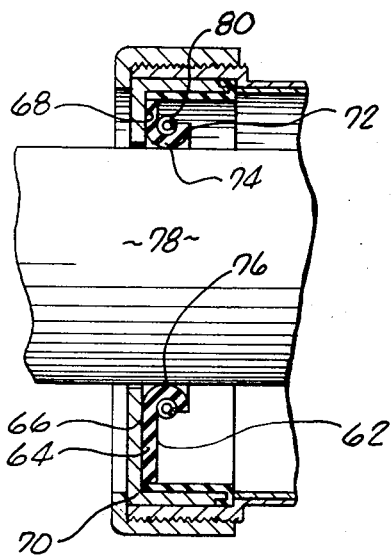
FIG. 5 is an end view of an offset connector disclosing a modified offset seal.
Figure 6:
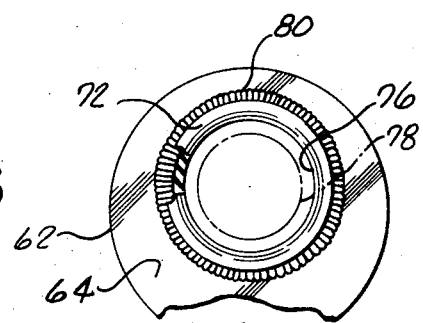
FIG. 6 is an elevational view of the modified offset seal shown in FIG. 5.

The seals 52 and 60 disclosed in FIGS. 2 and 3 are comparatively massive, but it is apparent that the principles of this invention can be practiced with other kinds of seals. In particular, the seal 62 shown in FIG. 5 is lighter than the seals previously disclosed and would be used if weight becomes a problem. This seal is an annular ring shaped element formed from a suitable rubber-like material. The seal is generally channel shaped in cross-section and is designed so one leg 64 bears against or is bonded to the inner surface 66 of the base 68 of the cup shaped closure 70. The seal 62 is provided with a second leg 72 disposed in inwardly spaced relations to leg 64. The legs are connected together by a webbed portion 74. The webbed portion 74 is provided with a pipe receiving opening 76 extending through the seal and this opening is offset from the center of the annular seal 62, see FIG. 6.

The seal 62 is mounted in the cup shaped closure 70 with the webbed portion bearing against the outer surface of the pipe 78. The seal 62 is formed from a silicone rubber like material and long continued use under high temperature causes the thin layer of the rubber like material bearing against the hot pipe 78 to harden and leakage to occur between the outer surface of pipe 78 and the webbed portion 74. To prevent this from happening a garter spring 80 is mounted on the seal as shown, and the garter spring 80 is sized to exert a continuous compressive force between the webbed portion 74 of seal 62 on the outer surface of the pipe. With this arrangement as the layer of compression set material gradually forms, the action of spring 80 is to continually bias and shape the compression set layer so that it adheres closely to the outer surface of the pipe and does not leak.

Under some circumstances, as where the connectors are located in a place where it would be difficult to remove the seal, if leakage should occur it would be useful to be able to vary the compressive force exerted by the seal on the external surface of the pipe.

Figure 7:
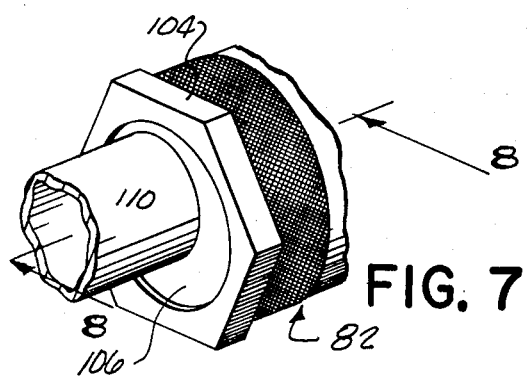
FIG. 7 shows a perspective of an end of a modified connector provided with adjustment means for correcting for leakage in the seal.
Figure 8:
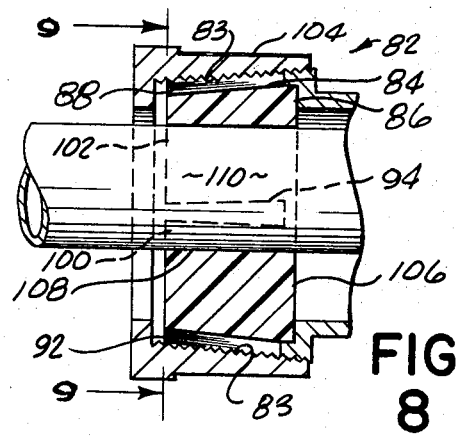
FIG. 8 is an elevational sectional view of an end of the modified connector shown in FIG. 7.

In the embodiment shown in FIGS. 7 and 8 the end 82 of the offset intermediate connector is counter bored at 84 defining a seal receiving shoulder 86. The counter bored portion is slit at 88, 90, 92 and 94 defining quarter segments 96, 98, 100 and 102.

In this embodiment a cup shaped tapered nut 104 serves both as a container for seal 106 and as a means for varying the compressive force between the seal 106 and the end of the connector 82. The seal is mounted in the cup shaped tapered nut bearing against the shoulder 86 as shown in FIG. 8, and is in sealing engagement therewith. The external surface of slotted counter bored portion of the end 82 of the intermediate connector is threaded at 83.

Figure 9:
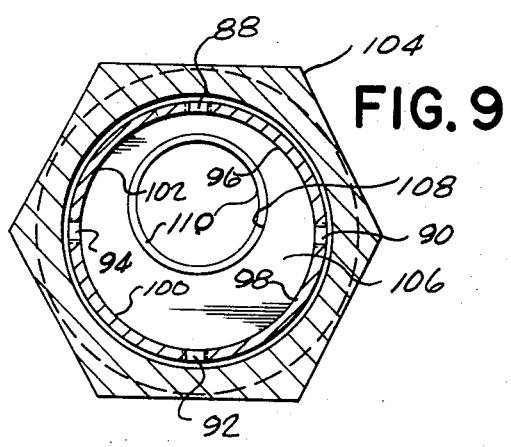
FIG. 9 is a sectional view taken on the line 9-9 of FIG. 8.

The seal 86 is provided with a pipe receiving bore 108 which is offset from the center of the seal, see FIG. 8. A pipe 110 extends through the bore and the bore is sized so the seal is in sealing engagement with the pipe, see FIGS. 7, 8 and 9. With this arrangement, if leakage should occur between the seal 106 and the pipe 110 it may be stopped by simply tightening the nut tapered 104 on the threaded portion 83.

In the embodiment shown in FIGS. 10, 11 and 12, the connector 112 includes an integral offset connector tube 114. This tube is provided with inwardly open channel shaped radially projecting ribs 116 and 118 at its opposite ends which hold O rings 120 and 122. Identical offset end connector tubes 124 and 126 are inserted in the opposite ends of the integral tube 114. The O rings 120 and 122 are thick enough so they project inwardly inside the tubes 114 and so the external surface of the offset connector tubes 124 and 126 ride on and can pivot on the seal while in sealing engagement therewith for reasons to be described below.

The opposite ends of the offset connector tubes 124 and 126 are sealingly connected to the misaligned tubes 12 and 14 in the manner shown and described in co-pending Pat. application No. 42,244. The offset connector tubes include a rigidly attached embracing collar 128 and 130. These collars are provided with radially outwardly projecting flanges 132 and 134. Restraining wires 136 are connected between these flanges to hold the offset connector tubes 124 and 126 inside the offset tube 114 when the tubes and pipes are pressurized.

With this arrangement, the intermediate connector 112 can automatically accommodate thermal expansion or contraction of the pipes 12 and 14 as well as the structural variations in the length of the pipes due to errors in fabrication. In addition, as shown in FIG. 12, the misaligned pipes 12 and 14 which are connected to the offset connector tube can pivot on seals 120 and 122 to accommodate some degree of non-axial misalignment.

The theory of the operation of the offset connectors is shown in the diagram of FIGS. 13 and 16. There the axes of the misaligned pipes 12 and 14 is indicated at 128 and 130. The effect of the offset seals on the offset connector tubes which are rotatably connected to the free ends of the misaligned pipes is to generate a circle, the circumference of which is the locus of all points on the axes of the bore in the rotatably mounted offset seal, or the pipe receiving opening at the opposite ends of the offset end connector tubes 124 and 126.

If the separation between the axes of the misaligned tubes is equal to or less than twice the radius of the offset of the connectors, the circles described above will intersect at least one point indicating that the axes of the offset bores in the seals or the pipe receiving openings in the offset end connector tubes will coincide so the misaligned pipes can be connected.

In the embodiment shown, the offset seals have been combined with an offset intermediate connector. It is, however, to be understood that where the misalignment is not too great, the offset seals could be rotatedly mounted at opposite ends of a generally cylindrical connector to connect all misaligned tubes or pipes within predetermined limits and to accommodate for thermal expansion or contraction variations in the size of the pipes, and some degree of non-axial misalignment. The same thing is true for the offset end tubes. However, under some conditions the misalignment would be too great for the offset seals or the offset end tubes. In particular, suppose the axes 138 and 140 of the misaligned tubes is separated by a distance S greater than twice the radius of the offset seals, or the offset of the end connector tubes. Under such circumstances, as seen in FIG. 14, the circumference of the locus of the axes of the bore in offset seals or the pipe receiving openings in the offset end tubes would not intersect so that the misaligned tubes could not be connected together. If, however, the seals or the offset end tubes were rotatedly mounted in the opposite ends of the offset connector 110 or 112, the effective radius of the offset would increase and if the effective radius of the offset were large enough the circumference of the locus of the point on the axes of the bore in the offset seal or the pipe receiving opening in offset end tubes would intersect at least once indicating that there are one or possibly two points at which the axes of the end connector tubes or seals would coincide so that the misaligned pipes could be connected together, see FIG. 15.

If the pipes 12 and 14 are not exactly parallel the offset end tubes 124 and 126 or the pipe receiving tubes 16 and 18 which pivot on the O ring seal, could pivot to accommodate such misalignment without introducing stress into this system of causing leakage.

With the arrangement discussed so far and within predetermined limits the connector system described can compensate for all parallel misaligned pipes, nonparallel misalignment, thermal expansion or contraction, and variations in the length of the pipes caused by errors in manufacture, and such pipes could still be connected together without stress.

Having described the invention what I claim as new is:

1. A connector of the class described comprising an integral tube, radially outwardly projecting heat radiating inwardly open annular channels formed on the ends of the tube, annular seals mounted in said channels, the thickness of said seals is sufficiently large so they project beyond said channels inwardly into said integral tube, said seals defining annular openings at each end of said integral tube, the center of one annular opening offset from the center of the annular opening at the opposite end, connector tubes having opposed ends, one end of each of said connector tubes extending into the opposite ends of said integral tube, alignment means on the opposite end of said connector tubes for axial connection with the ends of misaligned pipes, the periphery of said connector tubes in sealing and pivoting engagement with said seals, means connected between the connector tubes for preventing separation of the connector tubes from inside said integral tube when the tubes are pressurized but permitting the connector tubes and the attached misaligned pipes to expand axially into said integral tube to accommodate thermal expansion, tolerance variations in the length of the misaligned pipes, and permitting the connector tubes to pivot on the seals for connection with pipes having some degree of non-axial misalignment.

2. A connector of the class described comprising an integral tube, radially outwardly projecting inwardly open annular channels formed on the ends of the tube, annular seals mounted in said channels, the thickness of said seals sufficiently large so they project beyond said channels inwardly into said integral tube, the center of one annular opening offset from the center of the annular opening at the opposite end, connector tubes having opposed ends, one end of each of said connector tubes extending into the opposite ends of said integral tube, alignment means on the opposite ends of said connector tube for axial connection of said opposite ends with the ends of misaligned pipes, the periphery of said connector tubes inside said integral tube in sealing and pivoting engagement with said seals, an annular collar on each of said connector tubes, restraining wires connected between the annular collars on the connector tubes for preventing separation of the connector tubes from inside said integral tube when the tubes are pressurized but permitting the connector tubes and the attached misaligned pipes to expand axially into said integral tube to accommodate thermal expansion or tolerance variations in the length of the misaligned pipes, and permitting the connector tubes to pivot on the seals for connection with pipes having some degree of non-axial misalignment.

3. A connector of the class described comprising an integral tube, annular openings at each end of said integral tube, connector tubes having opposed ends, one end of each connector tube extending into the opposite ends of said integral tube, means attached to the connector tubes adjacent the ends extending in the integral tube for holding the ends of the connector tube in the integral tube, the opposite ends of each connector tube having a seal rotatably mounted therein, means mounted on said opposite ends of each connector tube for holding the seals therein, each seal having an axially extending pipe receiving bore extending therethrough, the axes of said bore offset from the axes of said tubes so that the pipe receiving bore can be moved in a circle by rotating said seals in said opposite ends of the connector tube whereby within predetermined limits axially misaligned pipes can be connected to said connector tubes by rotating said seals in the opposite ends of said connector tubes until the axes of said pipe receiving bore in said seals coincide with the axes of said misaligned pipes, said means on said opposed ends of said connector tubes including means for making a sealing connection with said misaligned pipes when said misaligned pipes extend through said bores.

4. The connector described in claim 3 including radially outwardly projecting inwardly open heat radiating annular channels formed on the opposite ends of the integral tube, annular seals mounted in said channels, the thickness of said seals sufficient so they project beyond said channels inwardly into said integral tube, the periphery of said connector tube in sealing and pivoting engagement with said seals to permit the connector tubes to pivot on said seals for connection with pipes having some degree of non-axial misalignment.

5. The connector described in claim 4 including an annular collar on each of said connector tubes, restraining wires connected between the annular collars on the connector tubes for preventing their separation when the tubes are pressurized but permitting the connector tubes and the attached misaligned pipes to expand axially into said integral tube to accommodate thermal expansion or tolerance variations in the length of the misaligned pipes.

6. The connector described in claim 3 wherein said seal is an annular ring shaped element formed from a suitable rubber-like material, said seal generally channel shaped in cross-section and comprising a first leg and a second leg separated by a webbed portion, said webbed portion defining an annular opening through said seal sized to receive and sealingly engage a pipe, the center of said annular opening offset from the center of said seal.

7. The connector described in claim 3 wherein said seal is an integral cylindrical element formed from a generally rubber-like material, said cylindrical element having a longitudinal bore extending therethrough, the axes of said bore offset from the axes of the integral cylindrical element.

8. A connector comprising an integral tube, connector tubes having opposed ends, one end of each connector tube extending into the opposed ends of said integral tube and rotatably mounted therein, said connector tube shaped so the center of the opposed end of each connector tube is offset from the center of the end in said integral tube so that the center of said opposed end can be moved in a circle by rotating said one end of said connector tube in said integral tube whereby within predetermined limits axially misaligned pipes can be connected to said opposed ends of said connector tube by rotating said one end of said connector tube until the centers of the opposed ends coincide with the axes of said misaligned tube means on said opposed ends of said connector tubes for making a sealing connection with said misaligned pipe, and means connected between said connector tubes for preventing separation of the connector tubes from inside said integral tube when the pipes are pressurized while permitting the connector tubes and attached misaligned pipes to expand axially into the integral tube to accommodate them thermal expansion and tolerance variations in the length of the pipes.

9. The connector described in claim 8 including radially outwardly projecting inwardly open annular channels formed on the ends of the integral tubes, annular seals mounted on said channels, the thickness of said seals sufficient so they project beyond said channels inwardly into said integral tube, the periphery of said connector tube in sealing and pivoting engagement with said seals to permit the connector tube to pivot on said seals for connection with pipes having some degree of non-axial misalignment.

10. The connector described in claim 9 including an annular collar on each of said connector tubes, restraining wires connected between the annular collars on the connector tubes for preventing their separation when the tubes are pressurized but permitting the connector tubes and the attached misaligned pipes to expand axially into said integral tube to accommodate thermal expansion or tolerance variations in the length of the connector tubes on the seal.

11. A connector of the class described comprising an integral tube, radially outwardly projecting heat radiating inwardly open annular channels formed on the ends of the tube, annular seals mounted in said channels, the thickness of said seals sufficiently large so they project beyond said channels inwardly into said integral tube, said seals defining annular openings at each end of said integral tube, the center of one annular opening offset from the center of the annular opening at the opposite end, connector tubes having opposed ends, one end of each of said connector tubes extending into the opposite ends of said integral tube, the periphery of said one end of said connector tubes in sealing and pivoting engagement with said seal to permit the connector tubes to pivot on said seals for connection with pipes having some degree of non-axial misalignment, the opposite ends of said connector tubes having annular pipe receiving openings, means related to the connector tubes for moving the axes of said pipe receiving openings around the periphery of a circle, pipes adapted to be sealingly connected to said opposite ends of said connector tubes in said pipe receiving openings whereby within predetermined limits axially misaligned pipes can be connected to said connector tubes by rotating said pipe receiving openings in said opposite ends of said connector tubes until the axes of said pipe receiving openings coincide with the axes of said misaligned pipes, and means connected between the connector tubes for seperation of the connector tubes from inside said integral tube when the tubes are pressurized but permitting the connector tubes and the attached misaligned pipes to expand axially into said integral tube to accommodate thermal expansion, and tolerance variations in length of the pipes.

12. The connecotor described in claim 11 wherein said means for prevention separation of the connector tubes from inside said integral tube when the pipes are pressurized, comprise an annular collar formed on each of said connector tubes, and restraining wires connected between the annular collars on the connector tubes at the opposed ends of said integral tube.

13. A connector of the class described comprising an integral tube, radially outwardly projecting heat radiating inwardly open annular channels formed on the ends of the tube, annular seals mounted in said channels, the thickness of said seals sufficiently large so they project beyond said channels inwardly into said integral tube, said seals defining annular openings at each end of said integral tube, the center of one annular opening offset to the center of the annular opening at the opposite end, connector tubes having opposed ends, one end of each of said connector tubes extending into the opposite ends of said integral tube, the periphery of said one end of said connector tubes in sealing and pivoting engagement with said seal to permit the connector tubes to pivot on said seal for connection with pipes having some degree of non-axial misalignment seals rotatably mounted in the opposite ends of said connector tube, means mounted on said opposite ends of the connector tube for holding the said seals therein, each seal having an axially extending pipe receiving bore extending therethrough, the axes of said bore offset from the axes of said tubes so that the pipe receiving bores can be moved in a circle by rotating said seal in said opposite ends of the connector tubes whereby within predetermined limits axially misaligned pipes can be connected to said connector tubes by rotating said seals in the opposite ends of said connector tube until the axes of said pipe receiving bore in said seals coincides with the axes of the misaligned pipes, said means on said opposed ends of said connector tubes including means for making a sealing connection with said misaligned pipes, and means connected between the connector tubes for preventing separation of the connector tube from inside said integral tube when the tubes are pressurized but permitting the connector tubes and the attached misaligned pipes to expand axially into said integral tube to accommodate thermal expansion and tolerance variations in the length of the pipes.

14. The connector described in claim 13 wherein said means for preventing seperation of the connector tubes from inside said integral tube when the pipes are pressurized comprise an annular collar formed on each of said connector tubes, and restraining wires connected between the annular collars on the connector tubes at the opposed ends of said integral tube.

15. The connector described in claim 13 wherein said rotatably mounted seal is an annular ring shaped element formed from a suitable rubber like material, said seal generally channel shaped in cross section and comprising a first leg and a second leg seperated by a webbed portion, said webbed portion defining an annular opening through said seal sized to receiving and sealingly engage a pipe, the center of said annular opening offset from the center of said seal.

16. The connector described in claim 13 wherein said seal is an integral cylindrical element formed from a generally rubber like material, asid cylindrical element having a longitudinal bore extending therethough, the axes of said bore offset from the axes of the integral cylindrical element.

17. A connector of the class described comprising an integral tube, radially outwardly projecting heat radiating inwardly open annular channels formed on the ends of the tube, annular seals mounted in said channels, the thickness of said seals sufficiently large so they project beyond said channels inwardly into said integral tube, said seals defining annular openings at each end of said integral tube, the center of one annular opening offset from the center of the annular opening at the opposite end, connector tubes having opposed ends, one end of each connector tube extending into the opposed ends of said integral tube and rotatably mounted therein, the periphery of said one end of said connector tubes in sealing and pivoting engagement with said seals to permit the connector tubes to pivot on said seals for connection with pipes having some degree of non-axial misaligment, said connector tubes shaped so the center of the opposed ends of each connector tube is offset from the center of the end in said integral tube so that the center of said opposed ends can be moved in a circle by rotating said one end of said connector tube in said integral tube whereby within predetermined limits axially misaligned pipes can be connected to said opposed ends of said connector tubes by rotating said one end of said connector tube until the centers of the opposed ends coincide with the axes of the misaligned tube, means on said opposed ends of said connector tubes for making a sealing connection with said misaligned pipes, and means connected between the connector tubes for preventing seperation of the connector tubes from inside said integral tube when the tubes are pressurized while permitting the connector tubes and the attached misaligned pipes to expand axially into said integral tube to accommodate thermal expansion and tolerance variations in length of the pipes.

18. The connector described in claim 17 wherein said means for preventing seperation of the connector tubes from inside said integral tube when the pipes are pressurized comprise an annular collar formed on each of said connector tubes, and restraining wires connected between the annular collars on the connector tubes at the opposed ends of said integral tube.

* * * * *